(12) United States Patent
Miyamoto et al.

(10) Patent No.: US 7,750,276 B2
(45) Date of Patent: Jul. 6, 2010

(54) OPTICAL INFORMATION DETECTING METHOD, OPTICAL HEAD, AND OPTICAL DISC APPARATUS UTILIZING PLURAL PHOTODETECTORS

(75) Inventors: Harukazu Miyamoto, Higashimurayama (JP); Hideharu Mikami, Kawasaki (JP); Takeshi Shimano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 142 days.

(21) Appl. No.: 11/852,361

(22) Filed: Sep. 10, 2007

(65) Prior Publication Data

US 2008/0067321 A1    Mar. 20, 2008

(30) Foreign Application Priority Data

Sep. 11, 2006    (JP) .............................. 2006-245848

(51) Int. Cl.
G02B 27/40 (2006.01)
(52) U.S. Cl. ............................... 250/201.5; 369/110.02; 369/112.17; 369/112.19
(58) Field of Classification Search .............. 250/201.5; 369/110.02, 112.19
See application file for complete search history.

(56) References Cited

U.S. PATENT DOCUMENTS 5,671,207 A * 9/1997 Park ........................ 369/44.23

2003/0081222 A1 * 5/2003 Kato .......................... 356/495
2005/0002285 A1 * 1/2005 Ando et al. ............... 369/44.14

FOREIGN PATENT DOCUMENTS

JP    05-342678    12/1993
JP    06-223433    8/1994

OTHER PUBLICATIONS

U.S. Appl. No. 11/746,681, filed May 10, 2007, Shimano.

* cited by examiner

*Primary Examiner*—Georgia Y Epps
*Assistant Examiner*—Kevin Wyatt
(74) *Attorney, Agent, or Firm*—Antonelli, Terry, Stout & Kraus, LLP.

(57) ABSTRACT

In multilayer optical discs and high-speed optical discs, the amount of reproduction light per unit time greatly decreases and the reproduction signal quality (S/N) significantly drops due to the low effective reflectivity and the short read time of the medium. These problems are solved by causing reflected signal light from the optical disc and reference light, which is separated from the same light source and introduced into a detector without being shone onto the optical disc, to interference with each other on the detector. Detector outputs having four different interference states are simultaneously obtained, the interference states being displaced at intervals of 90° in terms of the phase relationship between the reference light and the signal. Based on a operation of the four detector outputs, a reproduction signal can be obtained that is stable at all times and amplified with high quality, even when there is an optical path length variation due to disc undulations.

20 Claims, 8 Drawing Sheets

OPTICAL INFORMATION DETECTING METHOD, OPTICAL HEAD, AND OPTICAL DISC APPARATUS UTILIZING PLURAL PHOTODETECTORS

CLAIM OF PRIORITY

The present application claims priority from Japanese application JP2006-245848 filed on Sep. 11, 2006, the content of which is hereby incorporated by reference into this application.

BACKGROUND OF THE INVENTION

1. Field of the Invention

The present invention relates to an improvement of the signal-to-noise ratio of a reproduction signal from an optical disc apparatus.

2. Background Art

With the commercialization of Blu-ray Disc (BD) that employs blue semiconductor laser and a high-NA objective lens, the optical disc has virtually reached a limit in terms of optical system resolution, and for further increase in capacity, increasing the number of layers is believed to offer a major solution. In a multilayer optical disc, given the need to have substantially equal amounts of light detected from each layer, the reflectivity of certain layers inevitably needs to be reduced. However, in addition to the increases in the capacity of optical discs, their transfer speeds are also becoming faster due to the need to increase the speed at which videos, for example, are copied. Thus, it is becoming increasingly difficult to ensure a sufficient S/N ratio in a reproduction signal as is. Therefore, in order to increase the number of layers and achieve faster speeds in the future, it is indispensable to increase the S/N of the detection signal.

Technologies for increasing the S/N of a reproduction signal from optical discs are disclosed in Patent Documents 1 and 2, for example. In these technologies, in order to achieve higher S/N ratios in the reproduction signal from a magneto-optical disc, the light from a semiconductor laser is branched before the optical disc is irradiated therewith. The light that is not shone on the optical disc is composed with the reflected light from the optical disc such that they interfere with each other, so that the amplitude of a weak signal can be amplified by increasing the amount of the light that is not shone on the optical disc. In differential detection between the transmitted light that passed through a polarizing beam splitter and the reflected light, which is a conventionally employed technique for signal detection in magneto-optical discs, essentially the original incident polarization component is caused to interfere with a polarization component produced by rotation of polarization by the magneto-optical disc that is perpendicular to the incident polarization direction, so as to amplify the perpendicular polarization component using the incident polarized light for detection purposes. Thus, while the signal can be increased by increasing the original incident polarization component, the intensity of the light incident on the optical disc needs to be controlled to be lower than a certain level so as not to erase or overwrite data. To address such need, in the aforementioned conventional technologies, the light that is to be caused to interference with the signal light is separated in advance and then caused to interference with the signal light without focusing it onto the disc, where the intensity of the interfering light for signal amplification purposes can be increased regardless of the optical intensity on the disc surface. In this way, it becomes possible, in principle, to increase the S/N ratio by increasing the intensity within an allowed range thereof, relative to the noise in the amplifier for converting an optical current from the photodetector into voltage or the shot noise caused in the photodetector, for example.

In Patent Document 1, two beams of light are caused to interference with each other and the interference intensity is detected. In this case, the optical path length of the interfering, non-disc-reflected light is made variable so as to ensure an interference signal amplitude. In Patent Document 2, in addition to the interference intensity detection, differential detection is also carried out so as to cancel the intensity component of each light that does not contribute to the relevant signal, thus cancelling the noise components of such light and achieving a higher S/N ratio. In this case, the differential detection involves a beam splitter having no polarization.

Patent Document 1: JP Patent Publication (Kokai) No. 5-342678 A (1993)

Patent Document 2: JP Patent Publication (Kokai) No. 6-223433 A (1994)

SUMMARY OF THE INVENTION

The optical systems of the interferometers used in the aforementioned conventional art are all of the Mach-Zehnder type, which comprise a large number of optical components and are not suitable for reduction of the size of the optical system. None of the aforementioned references provide a detailed reason for using the Mach-Zehnder type optical system; it is inferred that, since the signal light from a magneto-optical disc is produced by the rotation of polarization, it was necessary to dispose a $\lambda/2$ plate capable of rotation adjustment for the adjustment of the polarization direction of the interfering light in the interfering optical path such that it allows transmission in one way and not reciprocating directions. Another problem is that the publications do not provide any method of adjusting the optical path difference of the two light beams, thus making the disclosed techniques difficult to apply for practical purposes. Regarding this problem, Patent Document 2 discloses that a reference mirror for obtaining interfering light is disposed on the disc in a spaced-apart relationship with the recording film; this, however, is a proposal for a new standard of disc and is not intended to increase the S/N ratio of the existing discs.

It is a first object of the present invention to provide an interference-type optical information signal detecting method which allows easy adjustment of the optical path difference between two beams of light, which has a high signal amplification effect, and which is suitable for reduction of the size of the optical system.

It is a second object of the present invention to provide an optical head comprising an interference-type optical information signal detection system which allows easy adjustment of the optical path difference between two beams of light, which has a high signal amplification effect, and which is suitable for reduction of the size of the optical system.

It is a third object of the present invention to provide an optical disc apparatus comprising an interference-type optical information signal detection system which allows easy adjustment of the optical path difference between two beams of light, which has a high signal amplification effect, and which is suitable for reduction of the size of the optical system.

In order to achieve the first object, the invention provides the following:

(1) A light beam emitted by a light source is divided into a first light beam and a second light beam; the first light beam is focused and an optical information recording medium is irradiated therewith; signal light reflected by the optical information recording medium is guided to four detectors; the second light beam is guided to the four detectors as reference light without focusing it onto the optical information recording medium; the signal light and the reference light are caused to optically interfere with each other on the four detectors, with the signal light and the reference light having different phases with each other; and all or some of outputs from the four detectors are selectively subjected to an operation to obtain a reproduction signal.

By thus selectively subjecting the outputs from the four detectors to an operation, it becomes possible to obtain the same reproduction signal as in a case of optimum phase alignment, even when there is a variation in the state of optical interference in the individual detectors.

(2) Specifically, the phases between the reference light and the signal light differ by 180° between a first detector and a second detector, they differ by 180° between a third detector and a fourth detector, and they differ by 90° between the first detector and the third detector.

In this way, of the 360° phase relationship, the four phase states displaced by 90° from each other can be simultaneously detected. Since the reproduction signal changes sinusoidally as the optical phase undergoes a 360°-change, it becomes possible to reproduce, based on an operation, the signal state in any given phase state by observing the four signals whose phases are displaced by 90°. Namely, stable reproduction and detection in any given phase state can be realized.

(3) The above operation comprises adding the square of a differential signal between the first detector and the second detector to the square of a differential signal between the third detector and the fourth detector.

In this way, since the phase of the group of the first and the second detectors differs from the phase of the group of the third and the fourth detectors by 90°, if the differential output of the former is a sine, the differential output of the latter is a cosine. Therefore, by taking the square-sum of the both, a constant maximum output signal can be obtained at all times.

(4) In another operation method, a square-root operation is added to the above operation to obtain a reproduction signal.

By performing such operation, the linearity of the reproduction signal increases. Namely, it becomes possible to obtain a reproduction signal that is proportional to the optical output of the light source.

(5) In the above selecting operation, either the differential signal between the first detector and the second detector or the differential signal between the third detector and the fourth detector is selected.

In this way, a signal from detectors that have higher signal quality can be selectively utilized, so that an improved S/N ratio can be obtained and, furthermore, the operation can be simplified (i.e., the squaring can be dispensed with).

(6) In another example of the operation, the result of multiplying the differential signal between the first detector and the second detector by a predetermined coefficient α is added to the result of multiplying the differential signal between the third detector and the fourth detector by a predetermined coefficient β.

Since this operation method does not involve the squaring of the detector output, the stability of the signal output can be improved. Namely, the influence of detection output fluctuations, such as laser noise, medium noise, and amplifier noise, can be reduced, enabling a high S/N detection.

(7) In practice, the coefficient α and the coefficient β are variably set on the basis of a mean value of each detector output taken over a predetermined period.

The phase difference between signal light and reference light varies due to the movement of the focusing lens (objective lens) as it tracks the optical information recording medium that moves up and down. As a result, the optimum coefficient values of α and β vary; however, it becomes possible to track-control α and β to optimum values by calculating the mean value of the detector output over a relatively long time (several tens to several tens of thousands of times the reproduction signal detection clock). When in fact a BD double-speed condition is considered, on the assumption that a 2× disc has a vertical deviation of about 0.2 mmpp and a maximum acceleration of 5 m/s, and that the linear velocity (BD2×) is 9.8 m/s at the radius of 58 mm, the maximum vertical deviation rate is 23 mm/s, which translates into the maximum phase change rate of 115000×2π/s. Thus, the minimum time it takes for the phase to change by 90° is 1/115000/4=2 μs, which is about 250 times the detection channel clock period. Thus, the detector output may be averaged over a shorter period of time (such as 100 times the channel clock or more) to determine the optimum values of α and β.

(8) Means for adjusting the optical phase difference (the difference in optical path lengths) between reference light and signal light is provided in the optical path of reference light.

In this way, the phase difference between reference light and signal light can be made smaller than the coherence length of the light source at all times. For example, when the coherence length is 100 μm, by controlling the optical path length difference to be 100 μm or smaller at all times, interference can be reliably ensured and the effect of the present invention (optical signal amplification by interference) can be obtained.

(9) The optical coherence length of the light source is made longer than the working range of the light-focusing means to the optical recording medium, such as an objective lens. Thus, interference can be ensured at all times regardless of the movement of the objective lens, whereby the effect of the present invention (optical signal amplification by interference) can be obtained.

(10) The distance between the means for focusing the light beam in the optical recording medium and the light source is fixed, wherein by moving the light source and the focusing means integrally, it becomes possible to keep the phase difference between reference light and signal light within the range of the optical coherence length. Thus, interference can be ensured at all times, thereby providing the effect of the present invention (optical signal amplification by interference).

In order to achieve the second object, the present invention provides the following:

(11) An optical head comprising: a semiconductor laser; a first optical element for separating a light beam from the semiconductor laser into a first light beam and a second light beam; an objective lens for focusing the first light beam onto a recording film surface of an optical information recording medium and receiving reflected light therefrom; reference-light-beam reflecting means disposed in the optical path of the second light beam; a first photodetector; a second photodetector; a third photodetector; a fourth photodetector; a second optical element for separating a light beam composed of the first light beam reflected by the optical information recording medium and the second light beam reflected by the reference-light-beam reflecting means, and causing the resultant light beams to become incident on the first photodetector and the second photodetector; a third optical element for composing the first light beam reflected by the optical information recording medium and the second light beam reflected by the reference-light-beam reflecting means in a phase relationship that differs from that of the light beam composed by the second optical element by 90°, separating the thus composed light beam, and causing the resultant light beams to become incident on the third photodetector and the fourth photodetector; and a casing in which the semiconductor laser, the first optical element, the objective lens, the reference-light-beam reflecting means, the first photodetector, the second photodetector, the third photodetector, the fourth photodetector, the second optical element, and the third optical element are disposed, wherein the phases of the first light beam and the second light beam differ by 180° between the first detector and the second detector, they differ by 180° between the third detector and the fourth detector, and they differ by 90° between the first detector and the third detector.

Thus, since reference light and signal light reflected by the disc can be composed on the first, second, third, and fourth detectors and amplified by an interference effect for reproduction, an optical head capable of detecting a very small reflected signal with a high S/N can be provided. Because the optical head itself includes a signal operation circuit, the signal obtained from the optical head is substantially the same as a conventional signal, so that the benefit of an improved S/N of the present invention can be readily appreciated.

In order to achieve the third object, the invention provides the following:

(12) An optical disc apparatus comprising: the optical head of (11); a control unit; and a signal processing unit, wherein the control unit controls the position of the optical head and that of the objective lens and the state of light emission by the semiconductor laser, and wherein the signal processing unit generates a reproduction signal from output signals from the first to fourth photodetectors.

Thus, since the reference light and the signal light reflected by the disc can be composed on the first, second, third, and fourth detectors and amplified by an interference effect for reproduction, a very small reflected signal can be detected with a high S/N. Namely, it becomes possible to significantly increase the S/N ratio in, particularly, a multilayer medium having low reflectivity and small signal amount, or during high-speed reproduction in which the influence of wideband noise is large.

In accordance with the present invention, no adjustment of the difference in the optical paths of two light beams is required in principle. Thus, an optical disc apparatus having a high signal amplification effect and comprising an interference-type optical disc signal detection system suitable for reduction of the size of the optical system can be provided inexpensively. Furthermore, a reproduction signal that is stable at all times and amplified with high quality can be obtained even when there is an optical path length variation due to the disc undulation and the like.

BRIEF DESCRIPTION OF THE DRAWINGS

FIG. 8B is 100 μm, and FIG. 8C is 1 mm.

DESCRIPTION OF THE PREFERRED
EMBODIMENTS OF THE INVENTION

In the following, embodiments of the invention are described.

Embodiment 1

Figure 1:
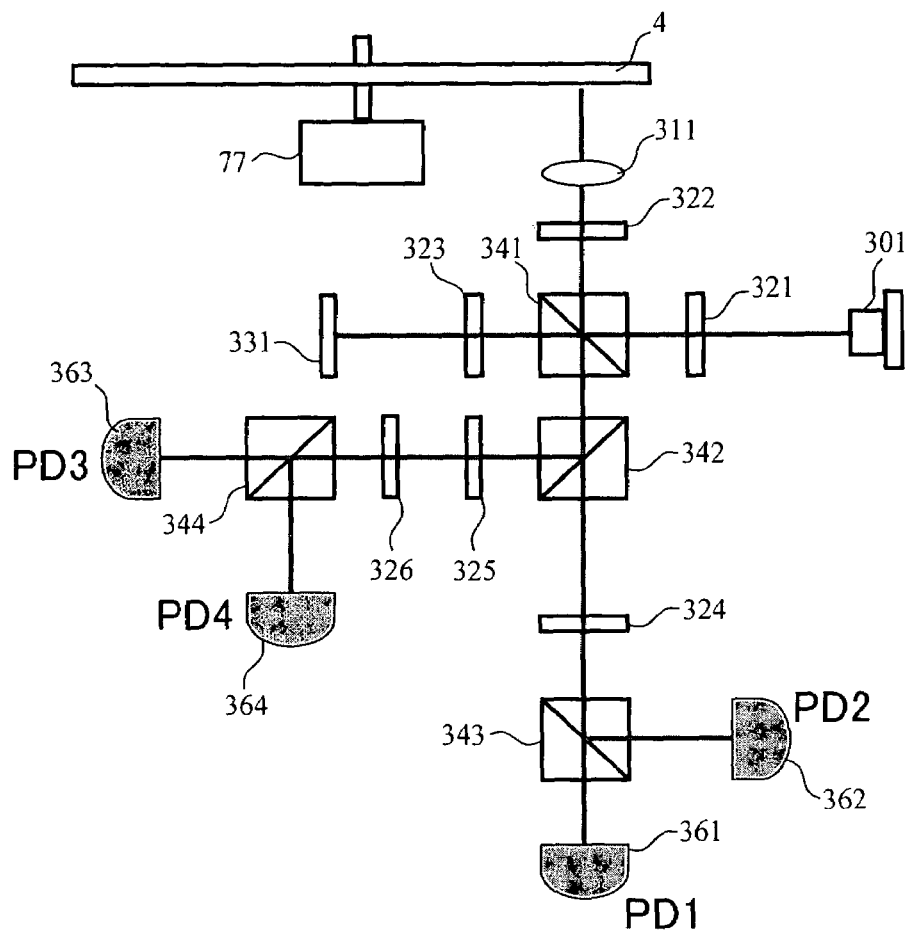
FIG. 1 shows a block diagram of an example of an optical system for realizing an optical information detecting method of the present invention.

FIG. 1 shows a block diagram of an optical system for realizing an optical signal detecting method of the present invention. Light emitted by a laser 301 passes through a first λ/2 plate 321 whereby the polarization direction of the light is rotated by 45°. The light with the rotated polarization is separated by a first polarizing beam splitter 341 into two beams of linearly polarized light that are perpendicular to each other. The light with one polarization (detection light) is reflected and passes through a first λ/4 plate 322, by which the light is converted into circularly polarized light, which is focused by an objective lens 311 and shone onto an optical disc 4. Reflected light (to be hereafter referred to as a signal light) from the optical disc 4 as it is rotated by a spindle motor 77, is returned back to parallel light by the objective lens 311 and then back to linearly polarized light via the first λ/4 plate 322. The direction of this linearly polarized light is perpendicular to that of the original light because the rotation direction of the circularly polarized light is reversed upon reflection by the disc surface. Thus, the signal light passes through the first polarizing beam splitter 341 and travels in the direction of a beam splitter 342. The light of the other polarization direction (to be hereafter referred to as reference light) that initially passed through the first polarizing beam splitter 341 passes through a second λ/4 plate 323 and converted thereby into circularly polarized light. The circularly polarized light is then reflected by a reference-light-beam reflecting means 331, and the reflected light is converted by the second λ/4 plate 323 into linearly polarized light perpendicular to the original reference light, as in the case of the signal light. Thus, this linearly polarized light is reflected this time by the first polarizing beam splitter 341, composed with the signal light, and then travels in the direction of a beam splitter 342. At this time, the signal light and the reference light are composed such that their polarization directions are perpendicular to each other.

Figure 2:
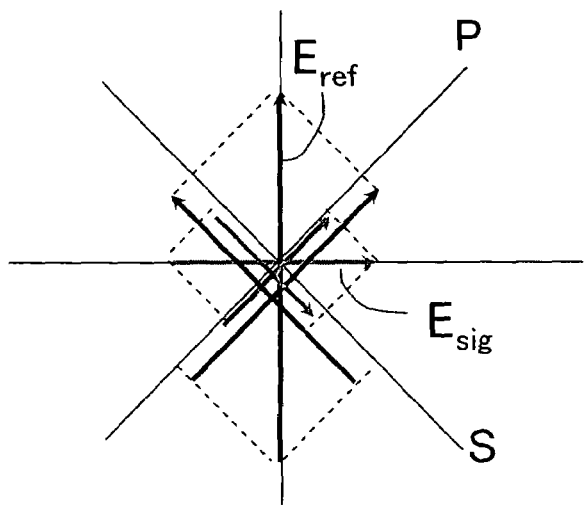
FIG. 2 illustrates the polarization directions of signal light and reference light, and the polarization directions of detection light.

One component of the composed light passes through the beam splitter 342, which is a half mirror, and then has its polarization direction rotated by 45° by a second λ/2 plate 324. The thus polarization-rotated light is then separated by a polarizing beam splitter 343 into perpendicular beams of linearly polarized light, which are detected by a first detector 361 (PD1) and a second photodetector 262 (PD2). FIG. 2 shows the relationships among the polarization components P and S detected by the two detectors PD1 and PD2, the polarization direction ($E_{sig}$) of the signal light, and the polarization direction ($E_{ref}$) of the reference light. The detector PD1 detects the P polarization, namely, the projection component of $E_{ref}$ and $E_{sig}$ in the P polarization direction; the PD2 detects the S polarization, namely, the projection component of $E_{ref}$ and $E_{sig}$ in the S polarization direction. In the case of this figure, with regard to the projection component in the S polarization direction, the sign of $E_{ref}$ appears reversed. Signals detected by the detectors PD1 and PD2 are represented by following equations:

$$I_{PD1} = \left| \frac{1}{2} E_{sig} + \frac{1}{2} E_{ref} \right|^2 \tag{1}$$
$$= \frac{1}{4}|E_{sig}|^2 + \frac{1}{4}|E_{ref}|^2 + \frac{1}{2}|E_{sig}||E_{ref}|\cos(\varphi_{sig} - \varphi_{ref})$$

$$I_{PD2} = \left| \frac{1}{2} E_{sig} - \frac{1}{2} E_{ref} \right|^2 \tag{2}$$
$$= \frac{1}{4}|E_{sig}|^2 + \frac{1}{4}|E_{ref}|^2 - \frac{1}{2}|E_{sig}||E_{ref}|\cos(\varphi_{sig} - \varphi_{ref})$$

As shown, the absolute values are squared because what is detected is light energy. In the above, $E_{ref}$ and $E_{sig}$ are assumed to be completely coherent for simplicity.

The other component of the composed light is reflected by the beam splitter 342, which is a half mirror, and is then given by a third λ/4 plate 325 a phase difference of 90° between signal light and reference light. After the polarization direction is rotated by 45° by a third λ/2 plate 326, the light is then separated by a beam splitter 344 into perpendicular beams of linearly polarized light, which are detected by a third detector 363 (PD3) and a fourth photodetector 364 (PD4). In this case, the relationships among the polarization components P and S of the light detected by the two detectors PD3 and PD4, the polarization direction ($E_{sig}$) of the signal light, and the polarization direction ($E_{ref}$) of the reference light are likewise expressed by FIG. 2; the present example, however, differs from the example of PD1 and PD2 in that there is the 90° phase difference between $E_{ref}$ and $E_{sig}$. The signals detected by the detectors PD3 and PD4 are expressed by following equations:

$$I_{PD3} = \frac{1}{8}|(1-i)E_{sig} + (1+i)E_{ref}|^2 \tag{3}$$
$$= \frac{1}{4}|E_{sig}|^2 + \frac{1}{4}|E_{ref}|^2 + \frac{1}{2}|E_{sig}||E_{ref}|\sin(\varphi_{sig} - \varphi_{ref})$$

$$I_{PD4} = \frac{1}{8}|(1+i)E_{sig} + (1-i)E_{ref}|^2 \tag{4}$$
$$= \frac{1}{4}|E_{sig}|^2 + \frac{1}{4}|E_{ref}|^2 - \frac{1}{2}|E_{sig}||E_{ref}|\sin(\varphi_{sig} - \varphi_{ref})$$

wherein (1+i) and (1−i) indicate that phase differences of ±45° (difference of 90°) are provided by the λ/4 plate to $E_{sig}$ and $E_{ref}$.

Thus, the signals detected by the respective detectors contain a component $|E_{ref}|^2$ that is irrelevant to the information on the optical disc. Therefore, differential signals between PD1 and PD2 and between PD3 and PD4 are obtained as follows:

$$Sig1 = I_{PD1} - I_{PD2} = |E_{sig}||E_{ref}|\cos(\phi_{sig} - \phi_{ref}) \tag{5}$$

$$Sig2 = I_{PD3} - I_{PD4} = |E_{sig}||E_{ref}|\sin(\phi_{sig} - \phi_{ref}) \tag{6}$$

thereby obtaining a signal that is a product of the signal light amplitude intensity and the reference light amplitude intensity. This shows that by increasing the intensity of the reference light, a greater signal output can be obtained; namely, the intensity of signal light can be amplified.

Equations (5) and (6) are accompanied by coefficients sin and cos, which denote the phase difference between signal light and reference light. However, since reference light and signal light travel along separate optical paths, and the objective lens 311 is moved up and down by focusing servo to track the disc as it rotates, the optical path length of the signal light continuously changes. Therefore, the phase terms of equations (5) and (6) are not established, with the result that the signal obtained in this system greatly fluctuates.

In accordance with the present embodiment, focusing on the fact that equation (5) is sine and Equation (6) is cosine, a signal is obtained by calculating the square root of the sum of squares of both, as follows:

$$S = \sqrt{(Sig1)^2 + (Sig2)^2} \tag{7}$$
$$= \sqrt{(I_{PD1} - I_{PD2})^2 + (I_{PD3} - I_{PD4})^2}$$
$$= |E_{sig}||E_{ref}|$$

This operation makes it possible to obtain a constant signal stably and reliably even if the phase of signal light and reference light changes. Since the signal obtained by the conventional signal detecting method for optical discs is simply $|E_{sig}|^2$, the signal of the present embodiment is:

$$|E_{sig}| \cdot |E_{ref}|/|E_{sig}|^2 = |E_{ref}|/|E_{sig}| \tag{8}$$

This indicates that the signal is amplified by the ratio of the amplitude intensity of reference light to that of signal light. As mentioned above, one of the problems of the multilayer disc is that its reflectivity is low, i.e., on the order of 5%, resulting in a reduced amount of signal light. The reference light of the present embodiment, since it is reflected by a reference-light-beam reflecting means having reflectivity of substantially 100%, has approximately 20 times greater energy intensity than that of signal light. Thus, it can be seen that the signal obtained in the present embodiment is amplified by a factor of the square root of 20, that is approximately 4.5. In the present embodiment, the reference-light-beam reflecting means comprises a corner prism to prevent the reflected angle displacement of the reflected light beam. Of course, a conventional mirror or a combination of a mirror and lens may be used.

Figure 3:
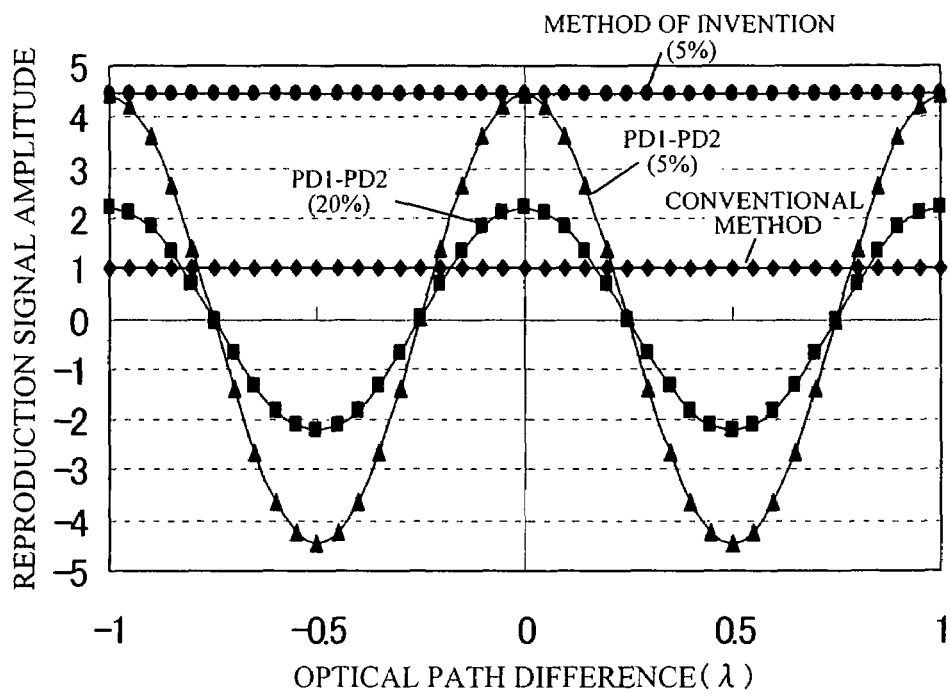
FIG. 3 shows the result of a signal amplification simulation of an embodiment of the present invention.

FIG. 3 shows a comparison of the reproduction signal amplitudes of the conventional detection method which outputs signal $|E_{sig}|^2$, a homodyne detection method employing only PD1 and PD2 to output Sig1, and the method of the present invention (homodyne-diversity detection). The horizontal axis shows the phase difference between signal light and reference light; the vertical axis shows reproduction signal amplitude in comparison to the conventional method. In the figure, the numbers 5% and 20% indicate the reflectivity of the medium. As shown, the homodyne detection method, which employs only PD1 and PD2 to output Sig1, is also capable of increasing the signal amount compared with the conventional method; this method, however, results in a significant deterioration in signal amplitude when the phase difference between signal light and reference light is changed by just about one tenth of the wavelength. On the other hand, it is seen that the method of the present invention is capable of constantly providing a large reproduction signal amplitude regardless of the phase difference between signal light and reference light.

Embodiment 2

Figure 8:
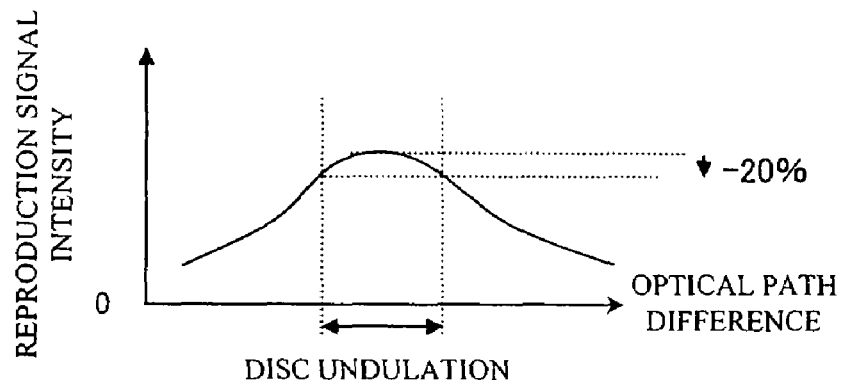
FIGS. 8A to 8C illustrate how the reproduction signal intensity changes as the coherence length of the light source is varied; the coherence length of FIG. 8A is 300 μm.
Figure 8:
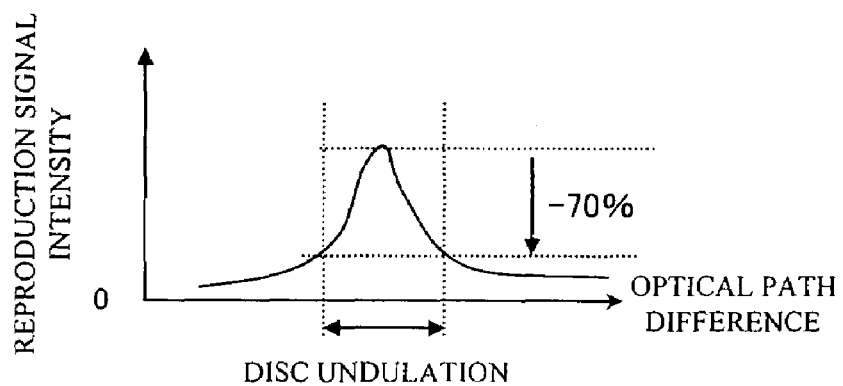
Figure 8:
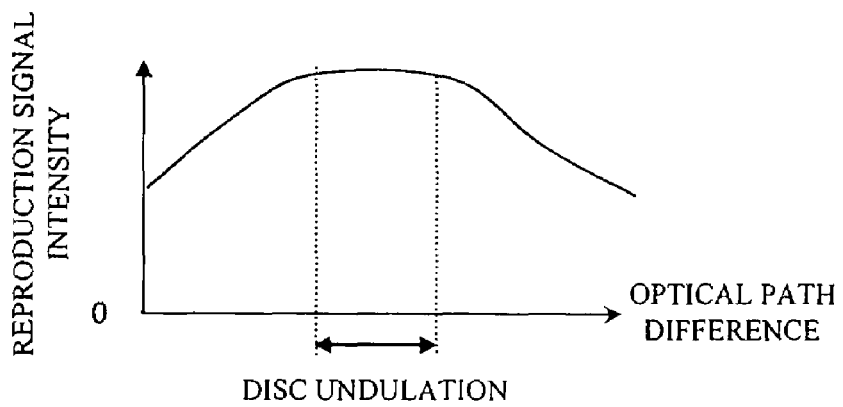

While in Embodiment 1 signal light and reference light were assumed to be completely coherent, the resonator length of conventional semiconductor lasers is short and their optical coherence length is not very long. FIGS. 8A to 8C show the change in reproduction signal intensity in a case where, in the configuration of Embodiment 1, a conventional blue-light semiconductor laser (LD) was employed. In order to track the disc as it undulates, the objective lens 311 is moved up and down, resulting in changes in the optical path length of the signal light. However, since the optical path length of reference light does not change, an optical path length difference is created between reference light and signal light. If such optical path length difference becomes greater than the coherence length of LD, the output of Equation (7) cannot be obtained. Generally, the output in an incompletely coherent state is Equation (7) times coherency. Coherency is 1, i.e., 100%, in a completely coherent state and zero in an incoherent state.

FIG. 8A shows an example of conventional reproduction (degree of modulation by RF superposition: approx. 350%; LD output: 2 mW). The optical utilization efficiency of the outward optical system in the present embodiment is approximately 60%. In consideration of the ½ separation by the first polarizing beam splitter, the amount of light with which the film surface of the disc is irradiated corresponds to approximately 0.6 mW. Due to disc undulations, the reproduction signal intensity is dropped by approximately 20%. Since the amount of undulation of the disc used in the present example is about 0.2 mmpp, this shows that with a displacement of about 100 µm in the optical path length from its optimum state, coherency decreases by about 20% and a signal output of only 80% of the optimum output can be obtained. FIG. 8B shows an example in which the modulation by RF superposition is increased by about two fold. In this example, it can be see that, due to the undulation of the disc, reproduction signal intensity is decreased to one half to one fourth. FIG. 8C is an example in which RF superposition is turned off so as to solve this problem. Generally, oscillation of LD is destabilized in the absence of RF superposition, resulting in an increase in noise. In the present example, such development of noise is suppressed by increasing the power of LD. Specifically, the angle of the first λ/2 plate 321 is adjusted such that signal light decreases and reference light increases. In this way, it becomes possible to increase the LD power by an amount corresponding to the decrease in signal light. In order to prevent the destruction of recorded information by reproduction light, the intensity of reproduction light was maintained at a constant level. In the present example, the ratio of reproduction light to reference light was set to 1:3. Thus, LD power was set to 4 mW. Since the disc film surface power is 0.6 mW in the present example too, the signal light amount is the same as in FIGS. 8A and 8B; however, since the reference light intensity is increased by about three fold, the reproduction signal intensity is also simultaneously increased by a factor of the square root of 3.

Thus, by employing the optical signal detection method of the present embodiment, the reproduction signal intensity can be increased.

Embodiment 3

While in Embodiments 1 and 2 a reproduction signal was obtained by the operation according to Equation (7), it is also possible to obtain a reproduction signal without performing the square-root operation.

Namely, $(Sig1)^2+(Sig2)^2=|E_{sig}|^2 \cdot |E_{ref}|^2$ is used as the signal. Such operation does not require the square-root operation, so that the circuit configuration can be simplified and the energy of signal light becomes proportional to reproduction output. Since the reproduction signal output is also proportional to $|E_{sig}|^2$ in the conventional optical signal detection method, the method of the present embodiment has the advantage that it can employ the same conventional signal processing method.

Embodiment 4

Figure 5:
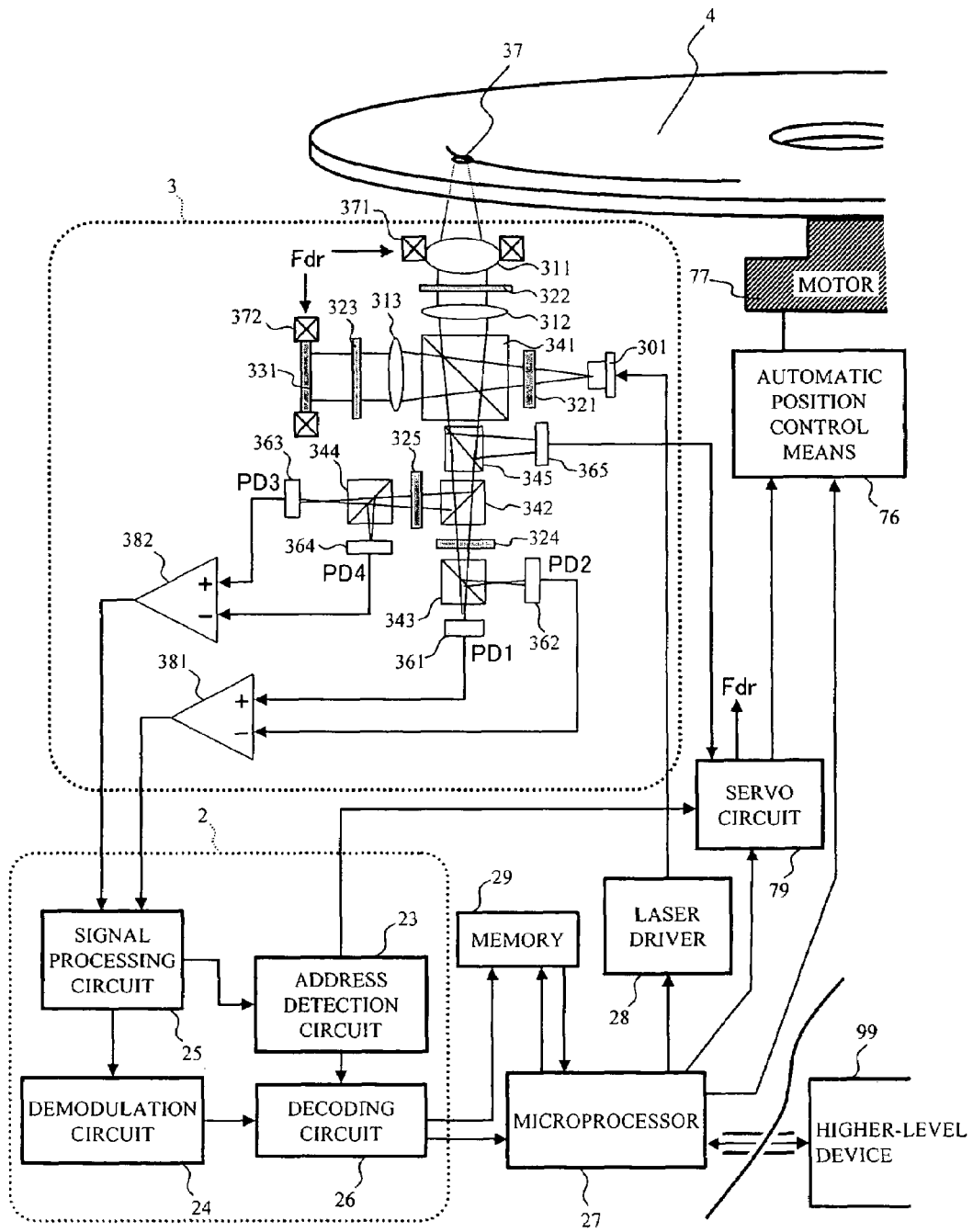
FIG. 5 shows a configuration of an optical disc apparatus according to an embodiment of the invention.

FIG. 5 shows a block diagram of an embodiment of an optical disc apparatus according to the present invention. Light emitted by a blue semiconductor laser 301 having a wavelength of 405 nm that is mounted on an optical head 3 passes through a first λ/2 plate 321, whereby the polarization direction is rotated by 45°. The light with the thus rotated polarization is separated by a first polarizing beam splitter 341 into two perpendicular beams of linearly polarized light. One polarization light (detection light) is reflected and collimated by a first collimator lens 312 into parallel light. The parallel light passes through a first λ/4 plate 322 by which to be converted into circularly polarized light, which is then focused by an objective lens 311 having NA0.85 and shone onto an optical disc 4. The reflected light (to be hereafter referred to as signal light) from the optical disc 4 is returned by the objective lens 311 back to parallel light and then back to linearly polarized light by the first λ/4 plate 322; however, since the direction of rotation of the circularly polarized light is reversed upon reflection by the disc surface, the direction of the linearly polarized light is perpendicular to the original light. Therefore, the signal light passes through the first polarizing beam splitter 341 and travels in the direction of a beam splitter 342. The light of the polarization direction (to be hereafter referred to as reference light) that initially passed through the first polarizing beam splitter 341 is converted by a second collimator lens 313 into parallel light, which passes through a second λ/4 plate 323 and is thereby converted into circularly polarized light. The circularly polarized light is reflected by a reference-light-beam reflecting means 331 and then converted by the second λ/4 plate 323 into linearly polarized light which is perpendicular to the original reference light, as in the case of the signal light. Therefore, the linearly polarized light this time is reflected by the first polarizing beam splitter 341, composed with the signal light, and then travels in the direction of the beam splitter 342. At this time, the signal light and the reference light are composed with their polarization directions being perpendicular to each other.

Some of the composed light is led by a servo beam splitter 345 to a servo detector 365, from which it is further led to a servo circuit 79 for producing servo signals for focusing and tracking purposes, for example.

One component of the composed light that has passed through the servo beam splitter 345 passes through a beam splitter 342, which is a half mirror, and then has its polarization direction rotated by a second λ/2 plate 324 by 45°. The thus rotated polarization light is thereafter separated by a polarizing beam splitter 343 into perpendicular beams of linearly polarized light, which are detected by a first photodetector 361 (PD1) and a second photodetector 262 (PD2). The resultant signals are the same as those of Embodiment 1; i.e., the signals expressed by Equations (1) and (2) are detected by PD1 and PD2. The outputs of PD1 and PD2 are fed to a differentiating circuit 381, which produces a differential signal Sig1.

The other component of the composed light is reflected by the beam splitter 342, i.e., a half mirror, and is then converted into circularly polarized light by a third λ/4 plate 325, which is disposed at an angle of 45° with respect to the polarization direction of the signal light and reference light. Because at this time the original polarization directions of the signal light and the reference light are different by 90°, the thus converted circularly polarized light has an opposite direction of rotation. This circularly polarized light is separated by a polarizing beam splitter 344 into perpendicular beams of linearly polarized light, which are detected by a third detector 363 (PD3) and a fourth photodetector 364 (PD4). The outputs of the PD3 and PD4 are fed to a differentiating circuit 382, which outputs a differential signal Sig2. While the arrangement of the optical elements for obtaining PD3 and PD4 differs from the above-described Embodiment 1, the resultant signals are the same as those of Embodiment 1; namely, the signals expressed by Equations (3) and (4) are detected by PD3 and PD4.

The thus generated differential signals Sig1 and Sig2 are fed to a signal processing circuit 25 residing in a reproduction block 2. The signal processing circuit 25 samples Sig1 and Sig2 upon input thereof and digitizes them to perform subsequent processing via digital operations. Namely, the process of Equation (7) of Embodiment 1 is carried out via digital operations.

Figure 10:
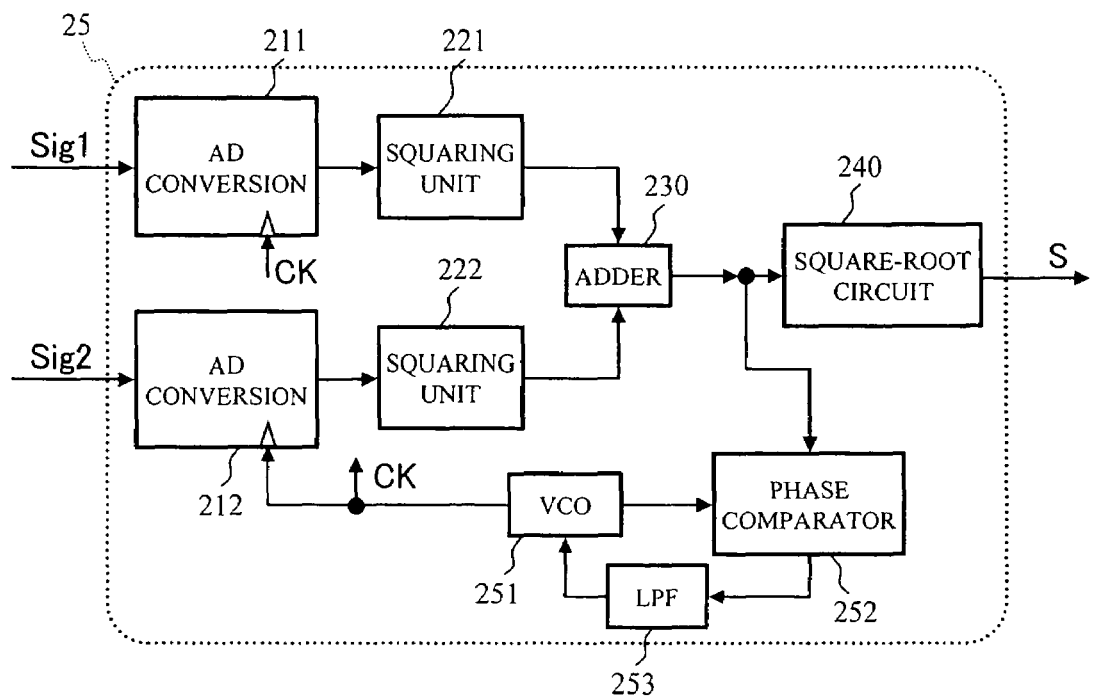
FIGS. 10A and 10B show a configuration of a signal processing block of the present invention.
Figure 10:
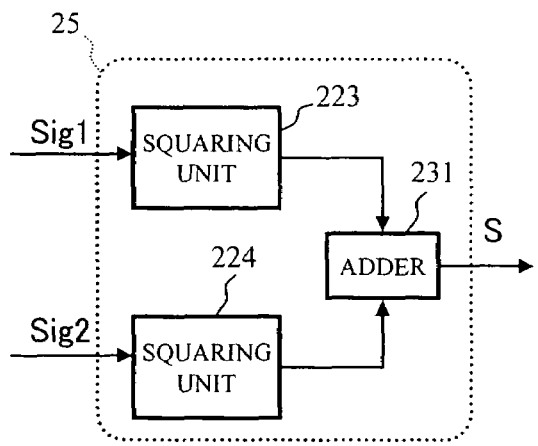

FIG. 10A shows a circuit block diagram of a concrete example of the signal processing circuit 25. Sig1 and Sig2 are digitized by AD conversion circuits 211 and 212, square-operated by squaring units 221 and 222, and then added by an adder 230. Thereafter, a square-root operation is performed in a squaring circuit 240, which outputs a digital signal output S. In order to obtain the sampling timing in the AD converters, the output of the adder 230 and the output of a voltage-controlled variable frequency oscillator (VCO) 251 are phase-compared in a phase comparator 252, whose output is then averaged by a low-pass filter (LPF) 253 and fed back to the control input of VCO. In other words, a phase-controlled clock signal (CK) is obtained by a PLL (phase-locked loop) circuit composed of the phase comparator 252, VCO 251, and LPF 253 to control the timing of AD conversion.

After appropriate digital equalization, the reproduction signal S produced by the operation of Equation (7) is fed to a demodulation circuit 24 and an address detection circuit 23, and then sent to a memory 29 and a microprocessor 27 as user data via a decoding circuit 26. The microprocessor, responsive to an instruction from a higher-level device 99, controls a servo circuit 79 or automatic position control means 76 as needed to position an optical spot 37 at any desired address. The microprocessor 27, depending on whether the instruction from the higher-level device is for reproduction or recording, controls a laser driver 28 to cause the laser 301 to emit light with an appropriate power and waveform. The servo circuit 79 controls the focus actuator 371 based on a servo signal and simultaneously controls the optical path difference adjusting means 372. The optical path difference adjusting means 372 controls the position of the reference-light-beam reflecting means 331 in accordance with a change in the optical path length of the signal light that accompanies the movement of the objective lens 311, so that the difference between reference light and signal light in their optical path lengths does not exceed 20 µm at all times. This distance of 20 µm is sufficiently small compared with the coherence length of 70 µm of the blue semiconductor laser 301 used in the present embodiment, that reference light and signal light are maintained in a substantially perfectly coherent state at all times.

Figure 9:
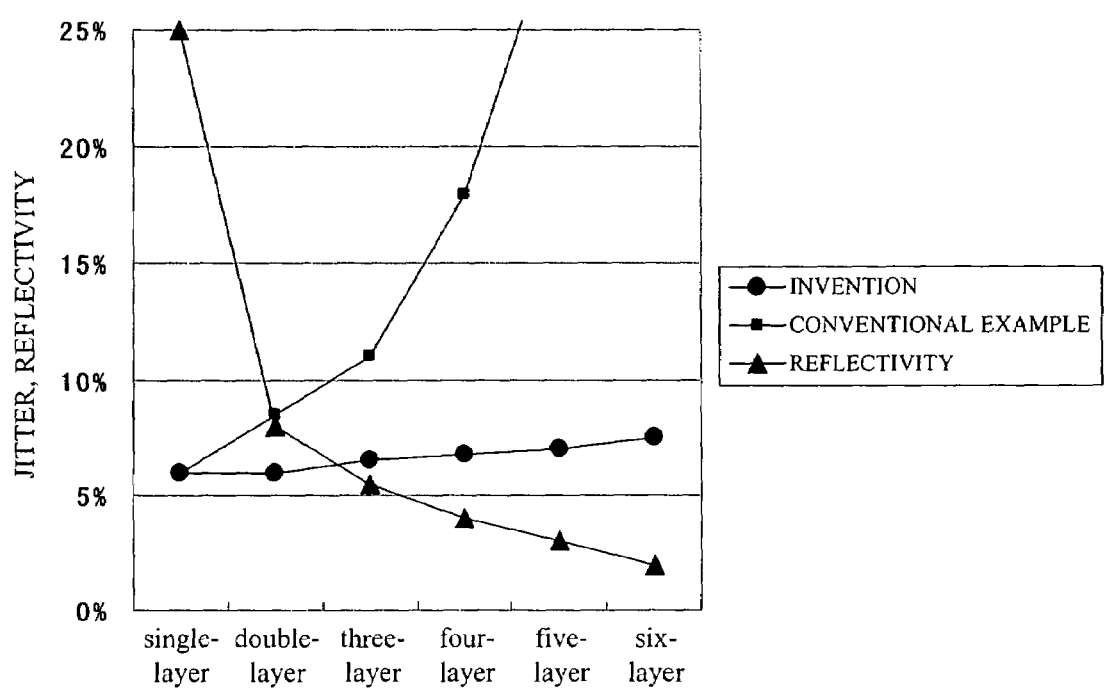
FIG. 9 shows an example of the effect of the present invention.

In the present embodiment, recording and reproduction was attempted on six kinds of discs having one to six recording layers as the recording medium. The discs, which were write-once (WO) discs having a recording capacity of 25 GB per layer of the disc, had a diameter of 120 mm and a maximum cover layer thickness of 100 µm. The cover layer thickness decreases as the number of layers increases; in the case of the six-layer disc, the cover layer thickness was about 50 µm and the interlayer distance was about 10 µm. FIG. 9 shows the reproduction signal quality (jitter) and reflectivity of these discs on which recording and reproduction was performed. The disc reflectivity decreases as the number of layers increases. With a conventional optical disc apparatus, jitter steeply increased as the reflectivity dropped, such that accurate reproduction of data was not possible in the case of four or more layers. However, with an apparatus of the present embodiment, reproduction jitter was maintained at approximately 7.5% or smaller even when the number of layers increased and reflectivity decreased. As a result, high-quality read/write is realized even in the six-layer disc, of which the reflectivity of each layer is on the order of 2%.

As described with reference to Embodiment 1, the signal is amplified by the amplitude intensity ratio of reference light to signal light. In the present example, since the reflectivity of the recording layer is on the order of 2%, the reference signal light obtained by the reference-light-beam reflecting means, whose reflectivity is virtually 100%, has approximately 50 times greater energy intensity than that of the signal light. Thus, it can be seen that the signal obtained in the present embodiment is amplified by a factor of the square root of 50, i.e., about 7. Namely, reproduction performance that is equivalent to the disc of the conventional example having reflectivity of 2%×7=14% can be realized.

Obviously, such satisfactory reproduction with the above multilayer discs is mainly due to the contribution of the effect of amplification of the reproduction signal amplitude described with reference to Embodiment 1. In addition, an interlayer crosstalk reduction effect is also a contributing factor for the satisfactory recording/reproduction. Specifically, in the present invention, since the signal amplification effect is obtained by causing reference light and signal light to interference with each other, sufficient amplification effect cannot be obtained in the case of reflected light from an unfocused layer because its wavefront or spot diameter on the detector would be different from those of reference light. Thus, crosstalk signal from another layer is hardly amplified, so that crosstalk is relatively reduced by an amount by which the signal from the relevant layer is amplified. In practice, in order to allow stable recording/reproduction in every layer of the multilayer medium of the present embodiment, it is necessary to control spherical aberration depending on a change in the cover layer thickness. While this is incorporated in the device (head) of the present embodiment, no such means is shown in FIG. 5 nor is it described herein as it is not related to the essential effects of the present invention.

Embodiment 5

While in Embodiment 4 the signal processing block had the circuit configuration shown in FIG. 10A, the present embodiment employs a circuit configuration shown in FIG. 10B. In this example, prior to digitalization (AD conversion), the signal:

$$S = (Sig1)^2 + (Sig1)^2 = |E_{sig}|^2 \cdot |E_{ref}|^2$$

shown in Embodiment 3 is obtained as an analog signal by analog squaring units 223 and 224 and an adder 231. Since the analog signal obtained in this example is equivalent (yet with a higher S/N) to a reproduction signal obtained by a conventional optical disc apparatus, the present signal processing unit is disposed at a stage prior to the signal processing circuit unit of the conventional optical disc apparatus. In the example of Embodiment 4, at least two high-speed A/D conversion circuits were required; in the present example, only one high-speed A/D conversion circuit is required, as in conventional digital signal processing circuits for optical discs. Thus, increase in cost can be prevented. This signal processing unit can also be mounted on the optical head 3; in this case, a conventional circuit can be used as the control circuit, including the signal processing unit, on the optical disc apparatus side.

Embodiment 6

Figure 4:
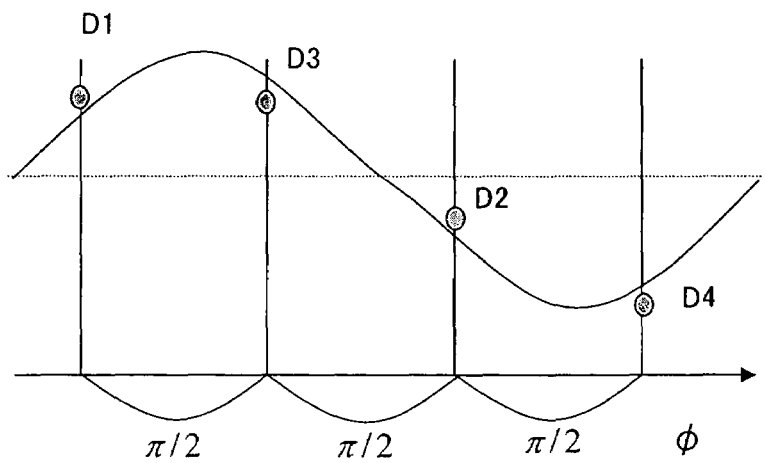
FIG. 4 illustrates the principle of phase diversity detection in accordance with the present invention.

In the foregoing embodiments, the relevant signal was obtained by square-sum operations based on the signals from four detectors. Generally, in the square-sum operation, there is the tendency that any fluctuation in the original signal is enlarged. When the optical path length difference varies, the reproduction output of each detector varies, as shown in FIG. 4. This is due to the change in the coefficients of the trigonometric functions in Equations (1) to (4), i.e., the state of interference between signal light and reference light. However, when signals are detected by the four detectors of the foregoing embodiments in which the detectors have phase differences between reference light and signal light that vary at 90-degree intervals, a relatively large output signal is obtained by any of the detectors. Thus, in the present embodiment, a method is adopted whereby the differential operation signals (Sig1, Sig2) of Equations (5) and (6) are each multiplied by a coefficient and then added to obtain a signal output. Namely, a reproduction signal is obtained by Equation (9). Coefficients α and β are calculated according to Equations (10) and (11).

$$S = \alpha \cdot Sig1 + \beta \cdot Sig2 \qquad (9)$$

$$\alpha = \frac{\overline{Sig1}}{\sqrt{\overline{Sig1}^2 + \overline{Sig2}^2}} \qquad (10)$$

$$\beta = \frac{\overline{Sig2}}{\sqrt{\overline{Sig1}^2 + \overline{Sig2}^2}} \qquad (11)$$

where the overline indicates a mean value. Namely, the two differential outputs Sig1 and Sig2 in FIG. 5 are averaged over several tens of nanoseconds to several hundreds of microseconds to obtain mean outputs, with which the coefficients are determined according to Equations (10) and (11). The coefficients are set in the multiplier to obtain a final signal output by the coefficient-sum operation according to Equation (9). The denominators of Equations (10) and (11) are provided for normalization such that $\alpha^2 + \beta^2 = 1$; the denominators, in principle (in the absence of noise), should be constant at all times, so that substantially the same effect can be obtained even when simply the mean value of Sig1 is used as α and the mean value of Sig2 is used as β, instead of using Equations (10) and (11).

Figure 11:
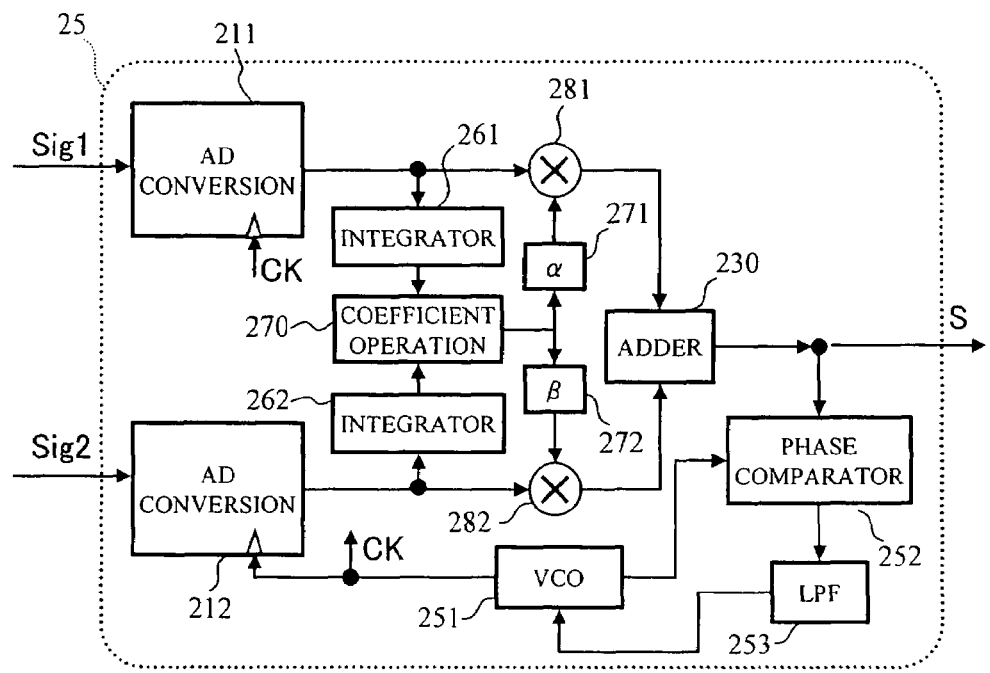
FIGS. 11A and 11B show another configuration of the signal processing block of the present invention.
Figure 11:
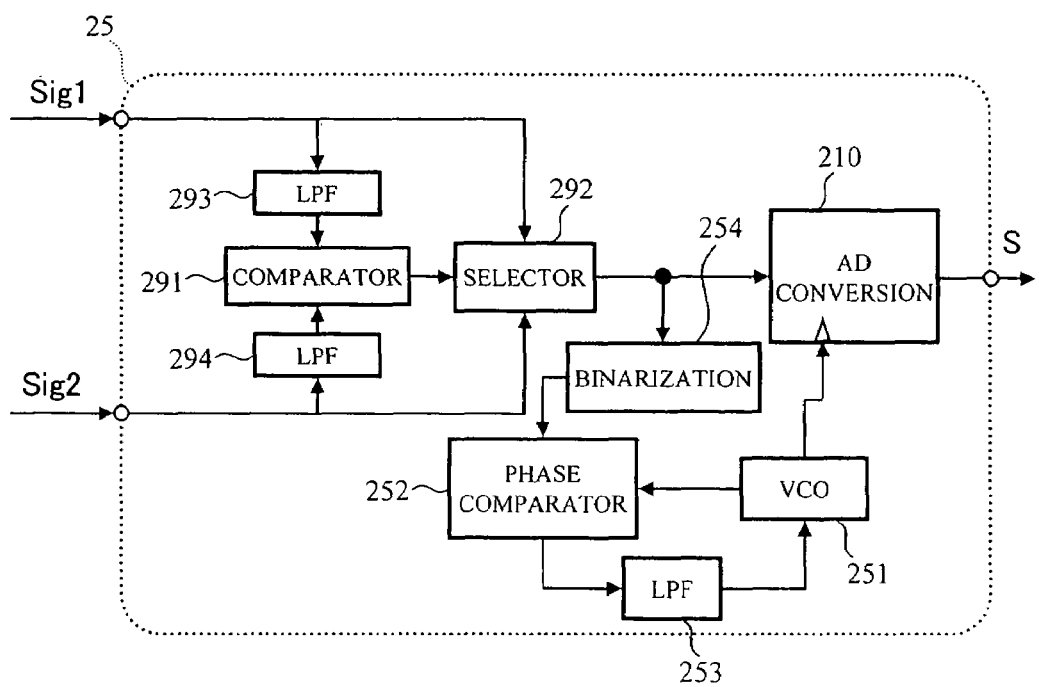

FIG. 11A shows a block diagram of the signal processing unit for realizing the signal processing in the present embodiment. The differential signals Sig1 and Sig2 are digitized by AD converters 211 and 212, whose digital outputs are fed to two integrators 261 and 262 where they are averaged. A coefficient operation block 270, using the mean values obtained by the integrators, calculates the coefficients α and β according to Equations (10) and (11), which are then set in coefficient holding circuits (resistors) 271 and 272, respectively. The two digitalized signals multiplied with the coefficients in the multiplier circuits 281 and 282 are added by an adder 230 to produce a digital signal output S in accordance with Equation (9). The timing for digitalization is determined by a clock output (CK) which is phase-controlled by a PLL (phase-locked loop) circuit composed of a phase comparator 252, VCO 251, and LPF 253 based on the output of the adder 230, as in the case of the example of FIG. 10A.

The duration of time for averaging in the integrators 261 and 262 is preferably dozens of times greater than the signal acquiring frequency (sampling rate) or the channel clock frequency. For instance, if the averaging duration is longer by a factor of 100, the influence of coefficient fluctuation due to signal variations can be reduced by a factor of the square root of 100, or 10, compared with a case of the direct square-sum operation. The coefficient, however, needs to be changed depending on the variation in the optical path length. From the viewpoint of noise control, the averaging duration should be longer; however, the phase difference between signal light and reference light changes as the focusing lens (objective lens) moves to track the up-down movement of the optical information recording medium. Therefore, it is necessary to track-control α and β to optimum values in response to such change. For example, a double-speed BD (Blu-ray disc) condition is considered. On the assumption that the disc has a vertical deviation of about 0.2 mmpp and a maximum acceleration of 5 m/s, with the linear velocity (BD2×) of 9.8 m/s at a position of radius 58 mm, the maximum vertical deviation rate is 23 mm/s, which translates into a maximum phase change rate of 115000×2π/s. Thus, the minimum time required for a 90° phase change is 1/115000/4=2 μs, which is about 250 times the detection channel clock period. Accordingly, it becomes possible to track the change in optical path length and reduce the influence of detection noise sufficiently by averaging the detector output within a time shorter than the aforementioned time (such as on the order of 100 times or greater than the channel clock, for example) to determine the optimum values for α and β.

In the present embodiment, variable coefficients are obtained by means of a mean output a signal. The effect of the invention can also be obtained by performing a signal processing in which, as shown in FIG. 11B, the magnitudes of the mean outputs of Sig1 and Sig2 obtained by low-pass filters 293 and 294 are compared by a comparator 291, and, based on the result of comparison, the greater signal is selected by a selector 292 and digitalized by an AD conversion circuit 210. In this case, the signal output could be reduced by the variation in the optical path length by as much as 30%; however, a sufficiently large signal-increasing effect can be obtained compared with conventional reproduction methods, so that the effect of the present invention can be obtained in the same way as in the foregoing embodiment.

Embodiment 7

Figure 7:
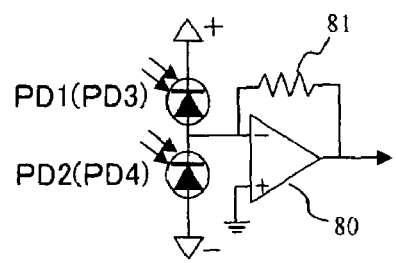
FIG. 7 shows an embodiment of an operation circuit according to the present invention.

Embodiment 4 involved an example in which the differential operation between detector outputs is realized with a simple differential circuit. In practice, however, each photodetector is associated with a current-voltage (IV) converting amplifier, and typically an electric output signal from an IV-amplifier-integrated detector (OEIC) is used. However, the IV conversion circuit itself poses a noise generating source due to thermal noise of the feedback resistance built inside the amplifier, the thermal noise being uniquely determined by the resistor value. Therefore, an increase in the number of detectors, as in the present invention, could lead to an increase in amplifier noise. In order to prevent the increase in amplifier noise, a differential detecting method may be employed, based on a circuit configuration shown in FIG. 7. In this method, detectors PD1 and PD2 are directly connected, with an IV amplifier 80 connected to the point of connection of PD1 and PD2. Because a differential signal can be obtained with a single amplifier for the two detectors, in principle 3 dB of noise reduction is possible. Furthermore, since the differential operation is already completed at the amplifier input stage, the DC component is cancelled and a high-gain IV conversion can be performed without the fear of amplifier saturation. Namely, the feedback resistance 81 can be increased. Since thermal noise is proportional to the square root of the feedback resistance 81 and the output is proportional to the feedback resistance 81, the output-to-noise ratio increases in proportion to the square root of the feedback resistance 81. Namely, a high S/N can be obtained.

Embodiment 8

Figure 6:
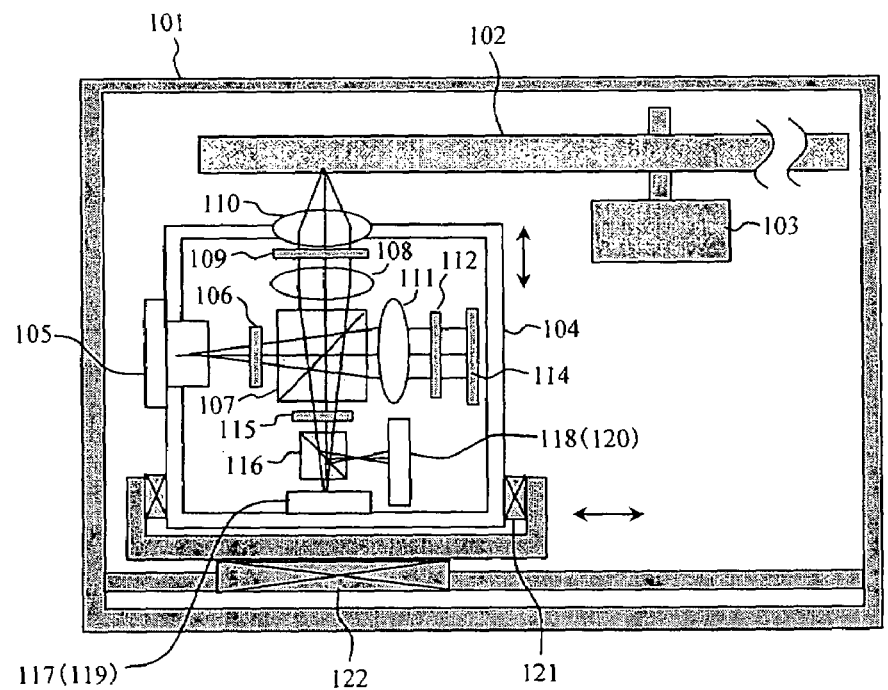
FIG. 6 shows a configuration of an optical disc apparatus according to another embodiment of the invention.

As another embodiment of the present invention, an example is described in which the invention is applied to an integral head wherein the entire optical system including the objective lens is moved integrally for focusing and tracking control. As shown in FIG. 6, in an optical disc apparatus casing 101, there are disposed an optical disc 102, a spindle motor 103, and an optical head device 104 for the recording and reproduction of information on the optical disc 102. The optical head device 104 is movable in the optical axis direction in which light is focused on the optical disc and the radial direction of the disc, by means of a focusing actuator 121 and a tracking actuator 122. The optical head device 104 contains a semiconductor laser 105. The light emitted by the semiconductor laser 105 has its polarization direction rotated by a $\lambda/2$ plate 106 and then becomes incident on a polarizing beam splitter 107. The polarizing beam splitter 107 reflects the s-polarization component while transmitting the p-polarization component. The reflected s-polarization component is converted by a collimator lens 108 into parallel light and then converted by a $\lambda/4$ plate 109 into circularly polarized light, which is focused by an objective lens 110 onto the recording film on the optical disc. The reflected light becomes incident on the objective lens 110 again and, upon passing through the $\lambda/4$ plate 109 again, is converted into linearly polarized light whose polarization direction is rotated by 90° with respect to the polarization direction upon incidence. The linearly polarized light then passes through the polarizing beam splitter 107. On the other hand, the p-polarization component that initially passed through the polarizing beam splitter 107 is converted by a second collimator lens 111 into parallel light, which is converted by a second $\lambda/4$ plate 112 into circularly polarized light. The circularly polarized light is reflected by a reference-light-beam reflecting means 114 and then becomes incident on the $\lambda/4$ plate 112 again, whereby it is converted into linearly polarized light whose polarization direction is rotated by 90° with respect to that of the initially incident light. The linearly polarized light is then reflected by the polarizing beam splitter 107.

In this way, the reflected light from the optical disc 102 and the reflected light from the reference-light-beam reflecting means 114 are composed, and the thus composed light becomes incident on a second $\lambda/2$ plate 115 whereby the linear polarization direction of each light is rotated by 45° before the individual light becomes incident on the second polarizing beam splitter 116. The light of the p-polarization component with respect to the separating plane of the second polarizing beam splitter is transmitted to become incident on a first photodetector 117, while the light of the s-polarization component is reflected and becomes incident on the second photodetector 118. While omitted in the figure, the composed light is also led to a third photodetector 119 and a fourth photodetector 120 via an optical element that provides a 90° phase difference between signal light and reference light, as in FIG. 1.

In the present example, the photodetectors 117, 118, 119, and 120 each comprise a photoreceiving portion that is divided for servo signal acquisition purposes; a servo signal is obtained by subjecting their output signals to an operation. For focusing error detection, the spot size method is used; for tracking detection, the push-pull method is used. A focusing error signal and a tracking error signal are each amplified and fed back to a focusing actuator 121 and a tracking actuator 122, respectively, shown in the figure, for a closed-loop control. Reproduction signal RFS is derived from total light amount signals $I_{PD1}$ to $I_{PD4}$ from the detectors 117 to 120 by employing Equation (7), as in Embodiment 1.

In the present example, since the entire optical system is actuated in an integral manner, the optical path length of the signal light does not change even when the disc is moved up and down. Namely, by designing the system such that the optical path length of reference light and that of signal light are equal in advance, the phase relationship between reference light and signal light can be maintained substantially constant. In practice, the phase difference fluctuates on the wavelength level, given the variation in the optical path length due to temperature change, the variation in the cover thickness or refractive ides of the disc, compensation for the initial adjustment error, and the like. However, the adoption of the signal acquisition method according to Equation (7) enables the acquisition of a stable signal output constantly regardless of phase fluctuation.

Thus, in accordance with the present invention, a high S/N ratio can be realized by causing reference light that is stronger than signal light to interfere with signal light, whereby the increase in the number of layers or the speed in an optical disc can be accommodated.

While the foregoing embodiments involved examples in which the light from a single light source is divided and used, it is also possible to use a first and a second light beam emitted by two light sources having optical coherence lengths longer than the distance that light travels in vacuum within a time corresponding to the reproduction signal data acquisition period. In this case, the wavelengths of the two light sources need to be substantially identical; however, since the optical interference state is substantially constant during the reproduction signal data acquisition period, the same effects of the present invention that have been described in the foregoing are obtained.

The optical system of the present invention is not limited to the examples shown in the foregoing embodiments (FIG. 1, FIG. 5, and FIG. 6). For example, as the optical element for obtaining signal outputs in the four phase difference states which differ by 90°, a complex optical functional element, such as a polarization control prism, polarizing diffractive optics, or nanophotonic material, can be employed. In any case, the effects of the present invention can be obtained by configuring the optical system such that at least four states of signal output having different states of phase difference between signal light and interference light can be obtained, and performing a signal operation/selection.

In accordance with the present invention, a high S/N ratio of a reproduction signal from an optical disc can be realized, whereby a multilayer optical disc and an optical disc apparatus having a high transfer rate can be realized.

What is claimed is:

1. An optical information detecting method comprising the steps of:
   dividing a light beam emitted by a light source into a first light beam and a second light beam;
   focusing the first light beam and irradiating an optical information recording medium therewith;
   guiding signal light reflected by the optical information recording medium to four detectors;
   guiding the second light beam to the four detectors as reference light without focusing it onto the optical information recording medium;
   causing the signal light and the reference light to optically interfere with each other on the four detectors, the signal light and the reference light having different phases from each other;
   selectively subjecting all or some of the outputs from the four detectors to an operation to obtain a reproduction signal;
   wherein a phase relationship between the reference light and the signal light (1) at a first detector differs by 180° from that at a second detector, (2) at a third detector differs by 180° from that at a fourth detector, and (3) at the first detector differs by 90° from that at the third detector; and
   wherein the operation comprises the addition of the square of a differential signal between the first detector and the second detector to the square of a differential signal between the third detector and the fourth detector.

2. The optical information detecting method according to claim 1, wherein the result of the addition is subjected to a square-root operation to obtain a reproduction signal.

3. The optical information detecting method according to claim 1, wherein the selective operation comprises selecting either the differential signal between the first detector and the second detector or the differential signal between the third detector and the fourth detector.

4. The optical information detecting method according to claim 1, wherein means for adjusting the optical phase difference (difference in optical path lengths) between the reference light and the signal light is disposed in the optical path of the reference light.

5. An optical information detecting method comprising the steps of:
   dividing a light beam emitted by a light source into a first light beam and a second light beam;
   focusing the first light beam and irradiating an optical information recording medium therewith;
   guiding signal light reflected by the optical information recording medium to four detectors;
   guiding the second light beam to the four detectors as reference light without focusing it onto the optical information recording medium;
   causing the signal light and the reference light to optically interfere with each other on the four detectors, the signal light and the reference light having different phases from each other;
   selectively subjecting all or some of the outputs from the four detectors to an operation to obtain a reproduction signal;
   wherein a phase relationship between the reference light and the signal light (1) at a first detector differs by 180° from that at a second detector, (2) at a third detector differs by 180° from that at a fourth detector, and (3) at the first detector differs by 90° from that at the third detector; and
   wherein the selective operation comprises adding the result of multiplying the differential signal between the first detector and the second detector by a predetermined coefficient $\alpha$ to the result of multiplying the differential signal between the third detector and the fourth detector by a predetermined coefficient $\beta$.

6. The optical information detecting method according to claim 5, wherein the coefficient $\alpha$ and the coefficient $\beta$ are variably set on the basis of a mean value of each detector output taken over a predetermined period.

7. An optical information detecting method comprising the steps of:
   dividing a light beam emitted by a light source into a first light beam and a second light beam;
   focusing the first light beam and irradiating an optical information recording medium therewith;
   guiding signal light reflected by the optical information recording medium to four detectors;
   guiding the second light beam to the four detectors as reference light without focusing it onto the optical information recording medium;
   causing the signal light and the reference light to optically interfere with each other on the four detectors, the signal light and the reference light having different phases from each other;
   selectively subjecting all or some of the outputs from the four detectors to an operation to obtain a reproduction signal; and
   wherein the optical coherence length of the light source is longer than the working range of the light-focusing means to the optical recording medium is movable.

8. The optical information detecting method according to claim 7, wherein the distance between the light source and focusing means for focusing the first light beam into the optical recording medium is fixed, wherein the light source and the focusing means are moved in an integral manner to adjust the state of focus of the first light beam on the optical information recording medium.

9. The optical information detecting method according to claim 7, wherein a phase relationship between the reference light and the signal light (1) at a first detector differs by 180° from that at a second detector, (2) at a third detector differs by 180° from that at a fourth detector, and (3) at the first detector differs by 90° from that at the third detector.

10. An optical head comprising:
    a semiconductor laser;
    a first optical element for separating a light beam from the semiconductor laser into a first light beam and a second light beam;
    an objective lens for focusing the first light beam onto a recording film surface of an optical information recording medium and receiving reflected light therefrom;

reference-light-beam reflecting means disposed in the optical path of the second light beam;
a first photodetector;
a second photodetector;
a third photodetector;
a fourth photodetector;
a second optical element for separating a light beam composed of the first light beam reflected by the optical information recording medium and the second light beam reflected by the reference light beam reflecting means, and causing the resultant light beams to become incident on the first photodetector and the second photodetector;
a third optical element for composing the first light beam reflected by the optical information recording medium and the second light beam reflected by the reference-light-beam reflecting means in a phase relationship that differs from that of the light beam composed by the second optical element by 90°, separating the thus composed light beam, and causing the resultant light beams to become incident on the third photodetector and the fourth photodetector; and
a casing in which the semiconductor laser, the first optical element, the objective lens, the reference-light-beam reflecting means, the first photodetector, the second photodetector, the third photodetector, the fourth photodetector, the second optical element, and the third optical element are disposed;
wherein a phase relationship between the first light beam and the second light beam (1) at the first detector differs by 180° from that at the second detector, (2) at the third detector differs by 180° from that at the fourth detector, and (3) at the first detector differs by 90° from that at the third detector.

11. The optical head according to claim 10, comprising a circuit for generating a differential signal between the outputs of the first detector and the second detector, and a circuit for generating a differential signal between the outputs of the third detector and the fourth detector.

12. The optical head according to claim 10, comprising means for adjusting the optical path length of the second light beam by moving the reference-light-beam reflecting means.

13. The optical head according to claim 10, wherein the objective lens is fixed to the casing, the optical head further comprising an actuator for moving the casing along the optical axis of the objective lens.

14. An optical disc apparatus comprising:
an optical head;
a control unit; and
a signal processing unit, wherein
the optical head comprises:
a semiconductor laser;
a first optical element for separating a light beam from the semiconductor laser into a first light beam and a second light beam;
an objective lens for focusing the first light beam onto a recording film surface of an optical information recording medium and receiving reflected light therefrom;
reference-light-beam reflecting means disposed in the optical path of the second light beam;
a first photodetector;
a second photodetector;
a third photodetector;
a fourth photodetector;
a second optical element for separating a light beam composed of the first light beam reflected by the optical information recording medium and the second light beam reflected by the reference light beam reflecting means, and causing the resultant light beams to become incident on the first photodetector and the second photodetector;
a third optical element for composing the first light beam reflected by the optical information recording medium and the second light beam reflected by the reference-light-beam reflecting means in a phase relationship that differs from that of the light beam composed by the second optical element by 90°, separating the thus composed light beam, and causing the resultant light beams to become incident on the third photodetector and the fourth photodetector; and
a casing in which the semiconductor laser, the first optical element, the objective lens, the reference-light-beam reflecting means, the first photodetector, the second photodetector, the third photodetector, the fourth photodetector, the second optical element, and the third optical element are disposed, wherein
the control unit controls the position of the optical head and that of the objective lens, and the state of light emission by the semiconductor laser; and
the signal processing unit generates a reproduction signal from output signals from the first to fourth photodetectors;
wherein a phase relationship between the first light beam and the second light beam (1) at the first detector differs by 180° from that at the second detector, (2) at the third detector differs by 180° from that at the fourth detector, and (3) at the first detector differs by 90° from that at the third detector.

15. The optical disc apparatus according to claim 14, wherein the signal processing unit performs an operation whereby the square of a differential signal between the first detector and the second detector is added to the square of a differential signal between the third detector and the fourth detector.

16. The optical disc apparatus according to claim 14, wherein the signal processing unit performs a process whereby the square root of the result of addition of the square of a differential signal between the first detector and the second detector to the square of a differential signal between the third detector and the fourth detector is calculated.

17. The optical disc apparatus according to claim 14, wherein the signal processing unit performs a process whereby either the differential signal between the first detector and the second detector or the differential signal between the third detector and the fourth detector is selected.

18. The optical disc apparatus according to claim 14, wherein the signal processing unit performs a operation whereby the result of multiplying the differential signal between the first detector and the second detector by a coefficient $\alpha$, which is variably set on the basis of a mean value of the signal over a predetermined period, is added to the result of multiplying the differential signal between the third detector and the fourth detector by a coefficient $\beta$, which is variably set on the basis of a mean value of the signal over a predetermined period.

19. The optical disc apparatus according to claim 14, comprising means for adjusting the optical path length of the second light beam by moving the reference-light-beam reflecting means.

20. The optical disc apparatus according to claim 14, wherein the objective lens is fixed to the casing, the apparatus further comprising an actuator for actuating the casing along the optical axis of the objective lens.

* * * * *